Figure 1:
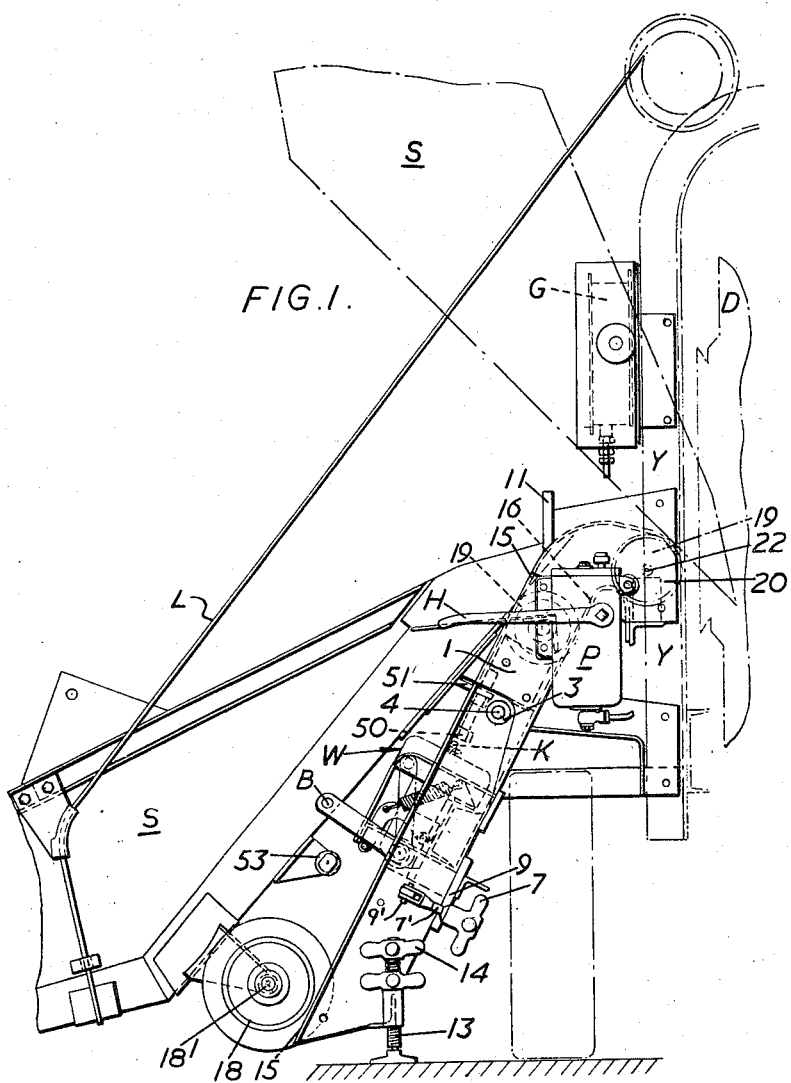

Aug. 19, 1958  N. E. KERRIDGE  2,848,212
PRESSURE RELIEF DEVICE FOR HYDRAULIC WEIGHING
Filed May 17, 1954  3 Sheets-Sheet 1

Inventor:
Norman Edward Kerridge
By:
Baldwin & Wight
Attorneys

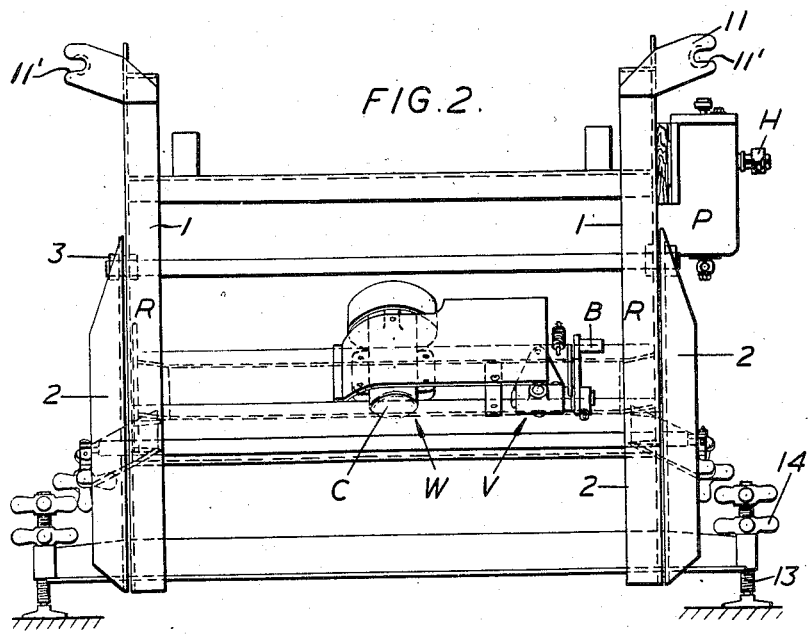

Aug. 19, 1958 N. E. KERRIDGE 2,848,212
PRESSURE RELIEF DEVICE FOR HYDRAULIC WEIGHING
Filed May 17, 1954 3 Sheets-Sheet 3
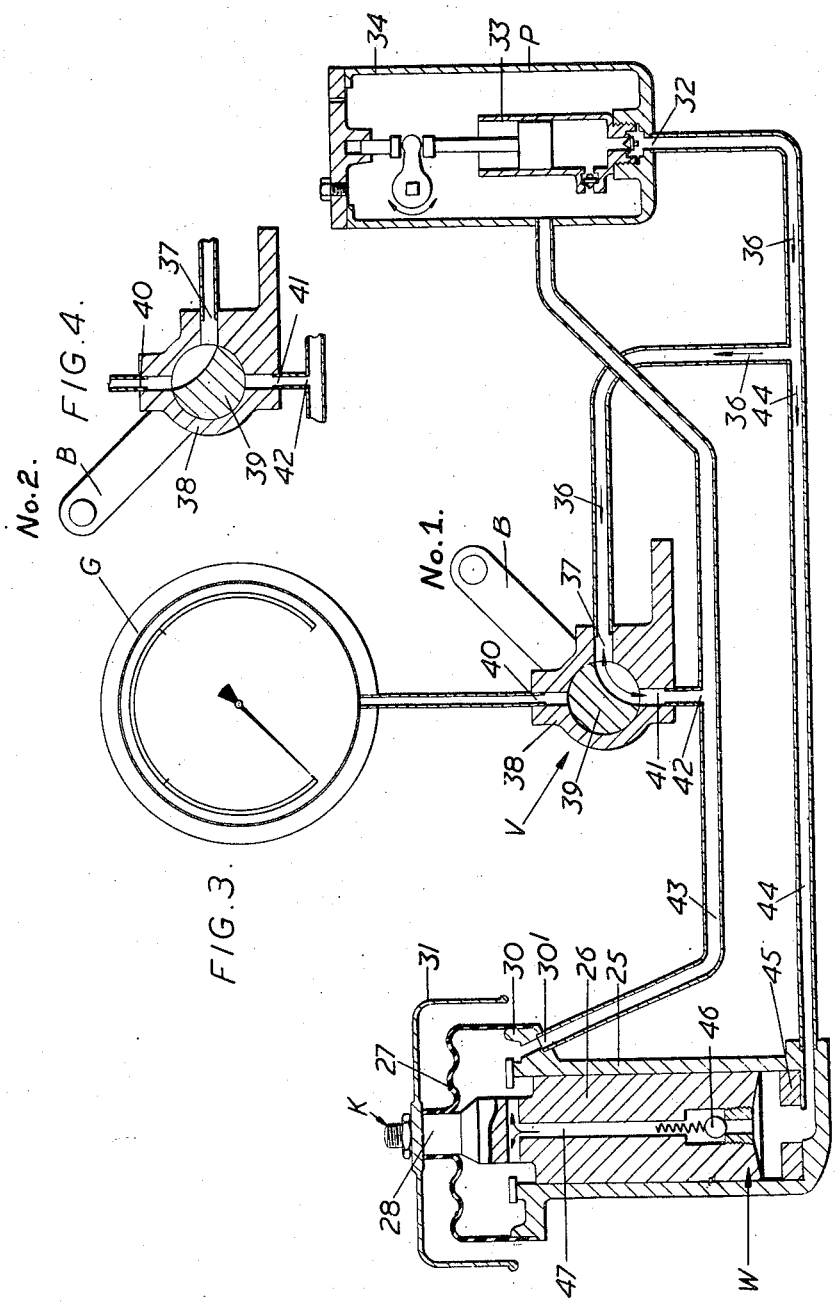
Inventor:
Norman Edward Kerridge
By:
Baldwin & Wight
Attorneys

United States Patent Office 2,848,212
Patented Aug. 19, 1958

2,848,212

PRESSURE RELIEF DEVICE FOR HYDRAULIC WEIGHING

Norman Edward Kerridge, Saltford, near Bristol, England, assignor to Stothert & Pitt, Limited, Bath, England, a company of Great Britain Application May 17, 1954, Serial No. 430,296

Claims priority, application Great Britain May 22, 1953

10 Claims. (Cl. 265—47)

This invention relates to skip or like weighing gear on mixing machines and more particularly is intended for use with concrete mixing apparatus of the type having a loading skip and with reference to which the invention is hereinafter described in detail.

Concrete mixing machines are of two distinct types commonly known in the trade as pivot loaders and rising loaders. This invention is concerned with a machine of the rising loader type wherein the skip has a linear movement up and down on what may be described as a ramp, usually consisting of two channelled guides which engage rollers on the skip. On arrival at the top of the ramp the linear movement of the skip is arrested and a pivotal movement takes place to discharge the contents of the skip.

There have been many attempts to produce a satisfactory design of weighing gear capable of giving accurately the weight of the several constituents of concrete when in the skip in order to obtain the correct proportions of mix without the use of a separate weigh batching device. The ordinary type of weighing machine is not sufficiently robust to withstand the treatment to which it is subjected, as sooner or later the skip will be allowed, either by accident or mishandling, to fall too rapidly, or a skip rope may break, thus causing serious damage to the weighing mechanism.

Attempts have been made to weigh the skip hydraulically but these are not satisfactory for several reasons, one of which is that the weight registered on the dial of the gauge depends upon the position in the skip in which the load is placed.

According to the present invention apparatus for loading measured quantities of materials into a receptacle, such as a mixing drum, comprises a loading skip, lifting gear for transferring the skip from loading position to a position for discharge into the receptacle and vice versa, in which the lifting gear comprises guide means arranged so that the skip in its movement to a loading position follows a straight line at a predetermined angle, and means for weighing the skip together with its contents, including a fluid operated ram so positioned in relation to the guide means that the skip when in its loading position can be engaged by the ram and the weight of the skip transferred from the lifting gear to the ram by displacement of the latter, in which the ram is operated by a pump under control of the operator and the weight is recorded by a gauge adapted to measure the pressure required to displace the ram to lift the skip.

According to a further feature of the invention, in order to allow the measuring ram, by which the weight of the skip and its contents can be ascertained, to descend to an inoperative position where it remains clear of the skip in case the latter should be allowed accidentally to fall, provision is made to relieve or to short circuit the pressure on the pressure side of the ram.

In carrying out this feature of the invention we may provide a valve device, operation of which is adapted to place opposite sides of the ram in direct communication with one another. In one form of the invention we utilise a three-way valve, which in one position interconnects the pump both with the ram cylinder and the pressure gauge but which in another position is so arranged that the gauge is disconnected and the pump circuit on the pressure side of the ram is short circuited directly through the pump cylinder or a reservoir containing the same. Actuation of the three-way valve device to relieve the pressure may be by means of a trip device which comes into operation as the skip ascends the ramp to discharge its contents by engaging a lever by means of which the valve is positively operated to short circuit the pump circuit.

According to a further feature of the invention, in order to reduce the frictional resistance to movement of the measuring ram against the bore of its cylinder these are both given a honed finish, no seals being fitted. By providing sufficient clearance between the ram and its cylinder it will permit gradual escape of the fluid from the pressure side of the ram to the non-pressure side of the ram, which can be accelerated by vibration which may be present or if not be induced by suitable means, the fluid being enclosed within the system by means of a diaphragm at the top of the ram cylinder and attached to the ram and its cylinder, the ram itself being thus virtually surounded by hydraulic fluid.

The invention is illustrated in the accompanying drawings, as applied to a concrete mixing apparatus, in which Figure 1 is a side elevation and Figure 2 a part front elevation with the loading skip in its lower position where weighing takes place. Figure 3 is a diagrammatic view showing the hydraulic circuit of the weighing equipment. Figure 4 is a detail view of the control valve.

In the drawings S indicates generally the skip and R the ramp up and down which the skip is moved to discharge its contents into the mixing drum D, which is of known rotary type, the discharge position being shown in dotted lines; ramp R at its upper end is fast with verticals Y forming part of the chassis frame of the concrete mixing apparatus. L indicates the skip ropes by which the skip is raised and lowered under the control of a motor not shown.

Part of the hydraulic weighing equipment can be seen at W and in Figures 1 and 2, P indicates a reservoir in which is housed the pump which in the embodiment illustrated is operated by means of a handle H. C indicates the cylinder of a ram, the operative end or head of the ram being shown at K. G is a pressure gauge.

The concrete mixing apparatus of this invention is essentially of the rising loader type and the runway R comprises channelled guides 1 which, in the case of a portable mixer fitted with wheels, are preferably arranged to fold up. For this purpose the guides are made in two portions, the lower and folding portion 2 of each channel having secured to the web a bush 3 by which it is hingedly supported on a transverse spindle 4 carried by the upper and fixed portions 1 of the guides. In its lowered position the folding portions 2 of the guides are secured by runway locking nuts 7 mounted on hinged screws, the nuts engaging lugs 9 on the machine frame. Brackets 11 at the top of the ramp serve in conjunction with the locking nuts 7 to fix the folding portions 2 in the travelling position.

It will be understood from the foregoing that the guides comprise a fixed and stationary part 1 to which the lower and folding parts 2 are pivotally attached so as to swing upwardly about the spindle 4. In the operating position shown in Figure 1 the folding parts 2 are held stationary by means of the locking nut 7 engaging lugs 9. Having released the locking nut 7 the clamp screws 7' are free to hinge about their pivots 9' so as to release the parts 2 when they can be raised and swung upwardly, where they lie flat against the brackets 11. When in this position the locking nuts 7 are moved to enter the slots 11' and are tightened.

Jacking screws 13 complete with lock nuts 14 are fitted to the ends of the guides 2 so that the machine can be made stable when working and in addition they provide a means of adjustment for levelling the machine on uneven ground.

The skip S is of standard construction in that it comprises a bucket provided with front and rear spaced flanged rollers 18, 19 mounted on spindles journalled in brackets fast with the underside of the skip.

The lateral flanges of the guide channels 1, 2 provide tracks up and down which the rollers 18, 19 run as the skip is raised and lowered. As can be seen from Figure 1 the upper flange 15 of the guide-way provides a track for the lower and back axle rollers 18 while the upper and front axle rollers 19 engage the underside of the flange 15 and the inside faces of the other flange 16.

At their upper ends the flanges 15, 16 are curved rearwardly and downwardly so as to provide at each side a swan neck terminating in a pocket 20 which limits the movement of the skip when raised to the discharge position. The pockets 20 conveniently take the form of an angle piece into which the ends of the axle 22 of the front rollers 19 move. It will be appreciated therefore that the pockets 20 determine the upper limit position of the skip and it is in this position that it swings from the full line position shown in Figure 1 to the dotted line position where its contents are discharged into the mixing drum (not shown).

Therefore, when in operation, starting with the skip in its discharge position the front axle 22 is in the pockets 20. As the skip is lowered by paying out the lifting ropes L, at first the front axle 22 remains stationary during which time the rear axle 18' carrying the rollers 18 describes an arc about the pocket centres until such time as the rollers 19 make contact with the flanges 15 of the guide channels. As the ropes L continue to be payed out and due to the weight of the skip the rollers 18 will run down the flanges 15 and 16 of the guide tracks 1, 2, pulling the front axle rollers 19 out of the pockets 20 into the guides, when the skip will move bodily down the guides until it reaches the ground.

It is a feature of this invention that the skip in moving down the guides 1—2 does not engage or make contact with any part of the lifting apparatus, i. e. the hydraulic ram, by which the contents of the skip, as will hereinafter be described, can be weighed with considerable accuracy. It follows therefore that should the skip be allowed to fall or to descend too rapidly as is frequently the case when handled by a labourer, it is impossible for damage to occur to the weighing mechanism.

The pressure gauge G forms part of the weighing mechanism and is mounted on anti-vibration flexible mountings. It is provided with a pointer whose position can be adjusted to zero. Valve means which in the embodiment illustrated, consists of a three-way valve, indicated at V in Figure 2, is provided to enable the gauge G to be isolated when the skip S is raised. This valve is controlled by means of a handle B so that it can be reset by hand when the skip has been lowered and is in its charging position.

To put the weighing mechanism into operation it is first necessary, therefore, for the operator to pull the lever B to position No. 2 which he does when the skip has been lowered to its charging position at the bottom of the guideways.

Referring now more particularly to Figures 3 and 4, the hydraulic ram comprises a cylinder 25 in which operates a piston 26. The cylinder 25 which is open at the top is closed in by means of a diaphragm 27 of rubber or other flexible material, the diaphragm having a central opening to fit over an extension 28 of the piston 26 to which it is fixed, its outer edge being anchored to a flange 30 on the cylinder. Flange 30 is conveniently provided with a pipe joint piece 30'. A cover plate 31 is secured to the extension 28 of the piston 26 to prevent damage to the diaphragm. The pressure side of the ram piston 26 is subject to pressure generated by means of a pump P (operated by hand) the pump cylinder 33, preferably as shown being housed within a reservoir chamber 34.

A pressure line 36 leading from the pressure side 32 of the pump is connected to one port 37 of the three-way valve V (see also Figure 4) which comprises a barrel 38 housing a valve plug 39. A second port 40 is connected directly to the gauge G and a third port 41 connects through a branch pipe 42 into a pipe connection 43 connected at one end to the joint piece 30' on the no-pressure side of the ram cylinder 25 and at its other end to the reservoir 34 and no-pressure side of the pump 33. The pipe line 36 from the pressure side of the pump to the three-way valve 38 is also connected directly via line 44 to the pressure side of the ram cylinder 25.

When it is desired to weigh, the valve is moved to the position shown in Figure 4, with hand lever B in position marked No. 2, so that the gauge is brought into circuit. On generating pressure by pump 33 in the line 36 it will be transferred via branch line 44 to the underside of ram piston 26. Ram piston 26 will now lift and engage a contact pin 50 carried by a bracket 51 on the underside of the skip. The pin 50 may be screw threaded to engage a threaded hole in the bracket, being held in its adjusted position by a lock nut.

The operator continues to pump until the lift ropes show slack and therefore he knows that the entire weight of the skip, or a predetermined component depending upon the angle of inclination of the skip, which, however, remains the same for all loads, has been transferred to the ram. The weight of the skip when charged will be proportional to the increased pressure (created by the load, i. e. amount charged into the skip) in the hydraulic system and since the gauge G is in direct connection with the pressure side of the pump through line 36 and ports 37 and 40 the pressure will register itself on the gauge. It will be appreciated, therefore, that there is no pressure used except the slight fluid pressure needed to raise the weight of the empty skip, the actual pressure which is finally registered by the gauge being created by the load being weighed.

Extreme accuracy is possible with the weighing mechanism of this invention. Firstly, in position No. 1 (Figure 3) there is no possibility of damage to the gauge which therefore may consist of a delicate instrument. In position No. 1 not only is the gauge isolated from the hydraulic circuit but the pressure side of the ram is connected with the reservoir and no pressure side of the ram, i. e. the top. This allows the ram to descend clear of the skip so that when the latter is lowered there is nothing to prevent it from reaching the ground i. e. the ram is freed.

When the lever is moved to position No. 2 (Figure 4) the pressure side of the ram is cut off from the reservoir and no pressure side of the pump and from the top of the ram, and is placed in direct connection with the pressure side of the pump and to the gauge, which is the weighing position. In this position the operator, by actuation of the pump raises the ram until it engages the skip and lifts it to a position where the lift ropes become slack (i. e. there is no tension). The pressure in the system and thus in the ram cylinder, which is recorded by the gauge, is used as a means of indicating the weight of the skip and its contents.

45 is a rubber block in the bottom of the cylinder 25 to act as a cushion in case the piston 26 is caused to bottom suddenly due to the skip rope breaking before the trip lever B has been operated to disconnect the gauge G.

The hydraulic shock which this might cause is dissipated by means of a spring relief valve 46 provided in a passageway 47 extending through the piston 26 and which is set to allow fluid to be transferred from below to above the piston when any sudden overload takes place.

In order to reduce to a minimum the frictional loss between the piston and the walls of the ram cylinder, they have a lapped finish and no rings or other sealing devices are fitted but leakage of hydraulic fluid from the system is prevented by the rubber diaphragm 27 fitted to the outer end of the ram piston, and which is protected against damage by the dome-shaped cover plate 31.

It will be noted that although the ram piston 26 has one way operation, i. e. is single acting, working fluid is present on both sides of the ram piston, the clearance between piston 26 and the cylinder wall being sufficient to permit a gradual escape from the pressure side to the non-pressure side without leakage occurring in the system because this remains closed by the diaphragm 27.

Furthermore this leakage is accelerated by vibration, which may be present or, if necessary, induced by a vibratory mass e. g. an out-of-balance shaft. Due to the fact that the ram is virtually surrounded by hydraulic fluid it ensures extreme accuracy in ascertaining the weight of the skip and its contents, which are measured by the pressure recorded on the gauge.

When the operator has lowered the skip and he wants to prepare to weigh, the valve operating lever B is depressed to bring it into the weighing position (shown in full lines in Figure 1). When in this position it lies in the path of a trip element, conveniently a roller 53 which, on the return movement of the skip to discharge position, will engage the lever and move it to its non-weighing position No. 1 (Figure 3 and in dotted lines in Figure 1) where the gauge is disconnected and where the chamber under the ram piston is connected to the reservoir, the no pressure side of the pump.

The operation of the skip and of its weighing will be clear from the foregoing description but may be summarized as follows:

Starting with the skip in its discharging position, the front and upper set of rollers 19 are in the dwell position 20 on the runway guide channels 1—2. When the skip is lowered, at first the front axle 22 remains stationary and the back axle 18' with the lower rollers 18 describes an arc around it until the back axle rollers make contact with the guide channels. These rollers then run down this incline pulling the front rollers out of the dwell portions into the guide channels. The skip then moves down the guides until it reaches the ground, without engaging or making contact with any part of the weighing apparatus. Thus should the skip be allowed to fall or to descend too rapidly, no damage can occur to the weighing mechanism.

In order to put the weighing mechanism into gear the valve operating lever B is next moved by hand from inoperative position to the weighing position shown in Figure 4 and in solid lines in Figure 3, thus operating the three-way hydraulic valve V.

The operator now pumps the hydraulic fluid from the reservoir 34 containing the pump 33 to the underside of the ram by means of the pump hand lever H. This raises the ram piston 26 until its uppermost point engages the adjustable contact pin 50 attached to the skip. The skip will then be lifted by the ram from the ground, which automatically slackens the hoist ropes and transfers the skip load to the ram. Thus, although the skip was originally lowered to the ground and its hoist ropes might have been carrying an indeterminate load, it is now completely supported by the weighing mechanism and its ropes are slackened off. This is the weighing condition and the operator knows when this is reached because the weighing pointer on the gauge G will have moved from a negative position on the dial to the zero position.

The skip is now loaded with the constituents of the mix required, and their individual weights are registered on the dial of the gauge, which may be graduated to register in pounds the load of the skip. The gauge has an adjustable zero so that the operator can tare off the weight of any material which may in time become "built up" in the skip.

After the skip has been charged the operator puts the skip hoist into operation. During the first part of the skip's ascent it rolls up the runway guides 1—2 until the upper wheels 19 are engaged in the horizontal portions. While this is taking place the trip or knock-off roller 53, which is fixed to the skip, engages the valve actuating lever B and moves it from weighing position back to its inoperative position, returning the three-way valve into position No. 1 shown in dotted lines in Figure 1, where it isolates the gauge and frees the hydraulic fluid in the ram cylinder 25 so that the ram piston returns to its bottom position. After this has taken place, if the skip is allowed to fall it can only strike the ground and no contact will be made with the weighing gear.

In the event of a skip rope breaking before the knock-off roller has moved the valve lever B to its inoperative position, the skip would fall a very short distance on to the ram, but the hydraulic shock this might cause can be dissipated by provision of the spring relief valve 46 in the centre of the ram piston 26 which is set to allow fluid to be transferred from below to above the piston if any overload takes place. The rubber pad 45 may be fitted at the bottom of the ram cylinder also to prevent damage to piston or cylinder in the event of the former "bottoming" violently.

What is claimed is:

1. In apparatus for loading measured quantities of materials into a receptacle, the combination of a load skip, lifting gear for raising the skip from loading position to a position for discharge into the receptacle and vice versa, guide means for the skip by which it is guided to and from discharge position and means for weighing the skip with its contents when in the loading position, comprising a ram device having a ram element movable into and out of engagement with the skip so that its weight is transferred from the lifting gear to the ram element, a pressure fluid circuit including a reservoir having a pump for transmitting pressure to the ram device to produce a displacement thereof to engage the skip, a gauge for measuring the pressure in the circuit, and means controlled by the upward movement of the skip which is automatic on movement of the skip by the lifting gear to the discharge position to relieve pressure in the pressure side of the ram device to permit movement of the latter to a position where it is clear of the skip when the latter is in ground position.

2. In apparatus for loading measured quantities of materials into a receptacle, the combination of a load skip, lifting gear for raising the skip from loading position to a position for discharge into the receptacle and vice versa, guide means for the skip by which it is guided to and from discharge position, and means for weighing the skip together with its contents comprising a pressure operated ram device having piston movable into and out of engagement with the skip to enable the weight of the latter to be transferred from the lifting gear to the ram piston, a fluid pressure circuit having a pump for transmitting pressure to the ram, a pressure gauge for indicating the pressure in the fluid pressure circuit, a valve element between the pump and the gauge having a first position connecting the pump and the gauge and a second position in which the gauge is disconnected when not weighing and in which position said valve relieves pressure in the ram, manually operable means for moving the valve element to said first position, and a trip device on the skip adapted when the latter is raised by the lifting gear to the discharge position to engage said manually operable means to move the valve element to said second position to relieve the pressure in the ram device to permit movement of said piston to a position where it is clear of the skip when in ground position.

3. In apparatus for loading measured quantities of materials into a receptacle, the combination of a load skip, lifting gear for raising the skip from loading position to a position for discharge into the receptacle and vice versa, guide means in the skip by which it is guided to and from discharge position, and means for weighing the skip with its contents when in the loading position comprising a pressure operated ram device having a piston movable into and out of engagement with the skip to enable the weight of the latter to be transferred from the lifting gear to the ram device, a pressure gauge connected for indicating the pressure in said ram device, a fluid reservoir housing a pump connected to the ram for producing pressure for the ram, a valve element between the pump and the gauge, said valve having a first position connecting the pump and the gauge and a second position in which the gauge is disconnected when not weighing and in which second position said valve relieves pressure in the ram, manually operable means for moving the valve element to said first position, and a trip member on the skip adapted when the latter is raised by the lifting gear to the discharge position to engage said manually operable means to move the valve element to said second position to relieve the pressure in the ram device to permit movement of said piston to a position where it is clear of the skip when in ground position.

4. Apparatus as claimed in claim 3 wherein the ram is single acting and comprises a cylinder and a piston therein, one end only of said cylinder being subject to pressure, there being fluid in both ends of said cylinder, said piston being formed so as to permit leakage therepast.

5. Apparatus as claimed in claim 4 in which a diaphragm closes the other end of said cylinder and said piston having clearance in said cylinder to provide said leakage.

6. Apparatus as claimed in claim 5 in which the ram piston is provided with an extension rod to which the diaphragm is fixed and to which a cover plate is mounted on the rod above the diaphragm to prevent damage thereto.

7. Apparatus as claimed in claim 6 wherein said ram cylinder has a flange provided with a pipe connection and to which the diaphragm is fixed.

8. Weighing apparatus suitable for weighing a loading skip used for measuring material in bulk and for discharging the same into a receptacle, and in which lifting mechanism is provided for lowering the skip to and raising it from loading position to discharge its contents, comprising a fluid pressure circuit, a ram including a cylinder connected in the circuit and having a ram piston adapted on a rise of pressure in the circuit for movement into engagement with the skip, said ram piston having a normal position wholly disengaged from the skip when the latter is in loading position, a gauge connected in the circuit for registering the pressure in the circuit, a pump device connected in the circuit for obtaining the necessary pressure to operate the ram and transfer the weight of the skip thereto whereby the weight of the skip can be determined and means for automatically relieving the pressure in the circuit when the skip is moved from the loading position toward its discharge position in order to prevent damage to the ram in the event of accidental release of the skip.

9. Weighing apparatus suitable for weighing a loading skip used for measuring material in bulk and for discharging the same into a receptacle, and in which lifting means is provided for lowering the skip into and raising it from loading position to discharge its contents, comprising a fluid pressure circuit, a ram including a ram cylinder having a single acting ram piston responsive to a rise of pressure in the circuit for movement into engagement with the skip, said ram piston having a normal position wholly disengaged from the skip when the latter is in loading position, one end only of said ram cylinder being subject to pressure in said circuit but so arranged that fluid is situated in both ends of the ram cylinder, said piston being so formed as to permit leakage past the ram piston, a diaphragm connected to the cylinder and to the ram piston at the other end of the cylinder to permit of unrestricted movement of the ram piston within the cylinder, a gauge connected in the circuit for registering the pressure in the circuit, a pump device connected in the circuit for obtaining the necessary pressure to operate the ram and transfer the weight of the skip to said piston, and means for automatically relieving the pressure in the circuit when the skip is moved from the loading position toward the discharge position in order to prevent damage to the ram in the event of accidental release of the skip.

10. Weighing apparatus as claimed in claim 9 wherein the ram piston has an extension rod, the diaphragm being secured to said rod and to a peripheral flange on the ram cylinder, and a cover plate for the diaphragm secured to the rod to prevent damage to the diaphragm.

References Cited in the file of this patent

UNITED STATES PATENTS

| 1,156,245 | Mosby | Oct. 12, 1915 |
| 1,855,420 | Robb | Apr. 26, 1932 |
| 1,877,980 | Schafer | Sept. 20, 1932 |
| 2,131,771 | Turnbull | Oct. 4, 1938 |
| 2,380,362 | Hem | July 10, 1945 |
| 2,457,655 | Gifford | Dec. 28, 1948 |
| 2,565,792 | Wagner et al. | Aug. 28, 1951 |
| 2,635,868 | Reid et al. | Apr. 21, 1953 |
| 2,659,592 | Wetsel | Nov. 17, 1953 |
| 2,758,726 | Butler | Aug. 14, 1956 |

FOREIGN PATENTS

| 13,238 | Great Britain | 1913 |
| 4,344 | Netherlands | Dec. 15, 1919 |